Patented Aug. 2, 1949

2,477,731

UNITED STATES PATENT OFFICE 2,477,731

SUBSTITUTED AMINOPYRIDINE-
ETHYLIDENE SULFONATES

Harris L. Friedman, New York, and Leo D. Braitberg, Yonkers, N. Y., assignors to Pyridium Corporation, Yonkers, N. Y., a corporation of New York No Drawing. Application August 23, 1945,
Serial No. 612,302

6 Claims. (Cl. 260—296)

Our invention relates to and has for its object, a group of new chemical compounds which are more stable than the original base and hence are useful as intermediates in the production of dyes and other compounds, and some of which have therapeutic properties and are useful for devitalizing bacteria and rendering them harmless or innocuous.

While the basic compounds from which we have formed the new therapeutic compounds of our invention have therapeutic properties, their physical and chemical properties are such as to render their proper application somewhat difficult and they require considerable care in their successful application.

These basic compounds are generally oily liquids, or low melting solids, practically insoluble in water and are somewhat unstable, coloring upon standing, and their decomposition products may be toxic and deleterious, and their acid salts are generally too acid for injection purposes.

One of the objects of our invention, therefore, is to produce new compounds which, while possessing therapeutic properties, will have none of the mentioned, and other disadvantages of the corresponding basic compounds.

We have found that alkali ethylidene sulfonate salts of these basic compounds possess higher therapeutic values than their corresponding basic compounds.

These therapeutic compounds of our invention are dry, stable powders and hence they can be administered in combination with food, in capsules, in tablet form, or parenterally injected in the form of a solution, and they, therefore, possess highly valuable physical, stable and administrative properties as compared with their corresponding basic compounds.

We have found further, that these therapeutic compounds of our invention, are particularly valuable in their effectiveness against *Mycobacterium tuberculosis*, although their usefulness is not limited to that particular disease, and that this effectiveness in the treatment of disease is greater than that possessed by the corresponding basic compounds.

We have found further, that these therapeutic compounds of our invention are less toxic than the corresponding basic compounds, and that they also possess the additional unexpected property of being practically unaffected in their anti-bacterial action in the presence of such biological inhibitory substances as p-aminobenzoic acid, peptones, serium, pus, etc., which are present in living organisms, which substances seriously reduce the effectiveness of other compounds.

This action of these therapeutic compounds of our invention against *Mycobacterium tuberculosis* is particularly unexpected and remarkable as they are relatively without effect against other pathogenic organisms such as *E. coli.*, *Staphylococcus aureus* and *Streptococcus pyogenes*.

Further, substances which were hitherto known to have activity against *Mycobacterium tuberculosis*, such as certain sulfonamide and related compounds, are greatly, if not completely, inhibited in the presence of biological inhibitory substances, which is known to account for the lack of sufficient tuberculosis activity of those previously known compounds.

Some of the inhibitory substances which are present in the human organism include para-aminobenzoic acid, serum, peptones, pus and other protein degradation products which have high content of inhibitory substances. Some of these inhibitory substances in the lesions of tuberculosis and other diseases, which produce large amounts of tissue breakdown, play a very important role in the inhibition of sulfonamide and sulfone compounds, and as a result of this inhibitory mechanism, therapeutic trials on the whole failed.

The activity of therapeutic compounds of our invention against *Mycobacterium tuberculosis* is not diminished, when p-aminobenzoic acid, peptones, serum, pus, etc., are present. We have found that these compounds of our invention inhibit the growth of various strains of tuberculosis organisms in various dilutions, some diluted as high as one part to 25 millions, depending upon the medium and strain of tuberculosis organism used.

As these inhibitory substances are present in the tubercular host, it is impossible to produce the desired therapeutic effect with sulfonamide and sulfone compounds, and hence any compounds which would practically retain their bacteriostatic properties irrespective of the inhibitory substances present would be of the highest value.

This property of the therapeutic compounds included within our invention of being practically uninhibited in bacteriostatic effectiveness, and especially in bacteriostatic effect against *Mycobacterium tuberculosis*, is entirely unexpected and cannot be predicated upon any prior knowledge relative to previously known bacteriostatic compounds, and is of the greatest importance and value in the treatment of infection.

We have found that when adequate precautions are taken to administer our compounds in such a manner and with such frequency as to insure a desired concentration of the respective compounds in the blood stream, they are effective in the treatment of tuberculosis.

Another advantage of the compounds of our invention is that following administration by whatever route chosen, concentration of the respective compounds in the blood of the recipient animals are higher and can be maintained with greater safety than is possible with the corresponding basic compounds.

The general formula of the compounds of our invention is

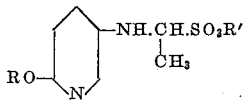

in which R represents an alkyl radical with not more than eight carbon atoms such as ethyl-, propyl-, butyl-, amyl-, hexyl-, heptyl-, octyl-, isopropyl-, isobutyl-, secondary butyl-, tertiary butyl-, isoamyl-, diethylmethyl-, dipropylmethyl-, allyl- and alkoxyalkyl radicals as methoxyethyl-, ethoxyethyl-, and butoxyethyl-, or aryl radicals such as phenyl-, naphthyl-, benzyl-, betapyridyl-, furfuryl-, p-aminophenyl-, p-aminobenzyl-, cyclohexyl-, tetrahydrofurfuryl-, phenyloxyethyl-, and benzyloxyethyl-, and in which R' is a member selected from the group consisting of hydrogen and alkali metals.

The general formula for the basic compounds from which we produce the compounds of our invention is:

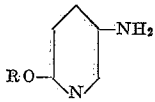

in which R represents an alkyl radical or an alkoxyalkyl radical having not more than eight carbon atoms or an aryl radical.

In producing our new compounds we react the free amine or the hydrochloride of the basic compounds dissolved in alcohol, or other suitable inert solvents, with acetaldehyde and an alkali metal bisulfite, such as sodium bisulfite or potassium bisulfite.

The following are examples of our processes for the production of the indicated compounds of our invention.

Example I

Thirty-one and two tenths grams sodium bisulfite were dissolved in 110 ccs. of water and 17.3 ccs. acetaldehyde added. Then 50 grams of 2-butoxy, 5-aminopyridine and 5 ccs. isopropanol were added and the mixture heated to about 60° C. under stirring. After a short while, the layers which were at first immiscible went into solution. The solution was then heated to 75° C. and kept at that temperature for 15 minutes and afterwards evaporated on the steam bath to a consistency of syrup, and placed into a vacuum desiccator over night. The next day the thick substance was stirred with acetone to form a slurry. 1000 ccs. acetone were used for this purpose. The suspended material was collected on a filter, washed with acetone and dried. The dried white powder was purified by recrystallization from 350 ccs. ethanol with the addition of charcoal. The product forms white lustrous crystals and the analysis confirmed the formula of

2-butoxy, 5-aminopyridine sodium ethylidene sulfonate, dihydrate.

Example II

To a solution of 4.16 grams sodium bisulfite in 20 ccs. water 1.76 grams acetaldehyde and 5.52 grams 2-ethoxy, 5-aminopyridine were added, and the mixture heated on the steam bath to about 50° C. until a complete solution took place. The mixture was then concentrated on the steam bath and after cooling the crystalline product, 2-ethoxy, 5-aminopyridine sodium ethylidene sulfonate, was collected on a filter, washed with ether and dried.

Example III

Five and two tenths grams sodium bisulfite and 3 ccs. of acetaldehyde were dissolved in 10 ccs. of water and 10 grams of 2-hexyloxy, 5-aminopyridine added. The mixture was heated on a steam bath to about 90° C. and to make a complete solution 2 ccs. methanol were added. After heating for 20 minutes the reaction mixture was cooled and formed a gel. Forty-five ccs. isopropanol were added which formed a granular precipitate. On addition of 300 ccs. ether the product, 2-hexyloxy, 5-aminopyridine sodium ethylidene sulfonate, came crystalline.

Example IV 2-octyloxy, 5-aminopyridine sodium ethylidene sulfonate was prepared from 5.52 grams of 2-octyloxy, 5-aminopyridine as in Example II. The product formed was composed of white lustrous crystals.

Example V

Two and seven tenths grams sodium bisulfite and 1.3 ccs. acetaldehyde were dissolved in 5 ccs. of water, then 3.5 grams 2-isoamyloxy, 5-aminopyridine were added. The amine dissolved completely in a few minutes. After addition of a large excess of acetone the product, 2-isoamyloxy, 5-aminopyridine sodium ethylidene sulfonate, came out as a white crystalline precipitate.

Example VI

Two grams 2-diethylmethoxy, 5-aminopyridine dihydrochloride were converted to the free base with alkali and extracted with ether. The ether solution was evaporated and was added to a solution of 0.5 gram acetaldehyde and 1.0 gram sodium bisulfite in 3 ccs. of water. After addition of 3 ccs. isopropanol it was heated on the steam bath for 5 minutes. After cooling 6 ccs. acetone were added, and the filtered solution evaporated to a consistency of syrup. Then acetone was added until a copious white precipitate formed. This product, 2-diethylmethoxy, 5-aminopyridine sodium ethylidene sulfonate, was collected on a filter and dried.

Example VII 2-allyloxy, 5-aminopyridine sodium ethylidene sulfonate was prepared from 3.5 grams of the 5-aminopyridine, 1.3 ccs. acetaldehyde and 2.7 grams sodium bisulfite in 5 ccs. of water. The white precipitate was recrystallized from ethanol and formed lustrous crystals.

Example VIII

A solution of 2.4 grams 2-methoxyethoxy, 5-aminopyridine dihydrochloride in 5 ccs. of water was neutralized with sodium hydroxide and extracted with ether. After the ether was evaporated the free amine was treated with a solution of 0.66 gram acetaldehyde and 1.5 grams sodium bisulfite in 2.3 ccs. of water. The reaction mixture was heated on the steam bath and then evaporated to dryness. This was dissolved in 50 ccs. ethanol, filtered, and the product 2-methoxyethoxy, 5-aminopyridine sodium ethylidene sulfonate, was precipitated out with 300 ccs. ether.

Example IX 2 grams 2-phenyloxy, 5-aminopyridine dihydrochloride were converted to the free base with alkali, extracted with ether and the ether evaporated. The base was then added to a solution of 0.3 ccs. acetaldehyde and 0.64 gram sodium bisulfite in 3 ccs. of water and 2 ccs. of isopropanol and heated up on the steam bath. The solution was evaporated to the consistency of syrup and 50 ccs. acetone were added. After the mass had stood over night a crystalline precipitate had formed. This was collected, dissolved in 6 ccs. ethanol, heated up with charcoal, filtered and after cooling, 3 ccs. acetone were added. The copious white crystals of 2-phenyloxy, 5-aminopyridine sodium ethylidene sulfonate were collected on a filter, and were then washed and dried.

*Example X*

One and five tenths ccs. of acetaldehyde were added to 5 ccs. of cold water and 3 grams sodium bisulfite. The resulting solution was maintained cold. Then 10 drops of a 20% solution of sodium hydroxide were added to make the solution pH 7.0. Now 5 grams 2-tetrahydrofurfuryloxy, 5-aminopyridine and 2 ccs. of isopropanol were added. The reaction mixture was then heated to about 60° C., and 10 ccs. isopropanol were added. The heating was continued for another 20 minutes. The solution was then cooled, the slight turbidity cleared up by filtering with filteraid, and the filtrate evaporated to the consistency of syrup. On addition of acetone a white precipitate formed which was collected on a filter and washed with acetone, and dried in a vacuum desiccator. The white product was 2-tetrahydrofurfuryloxy, 5-aminopyridene sodium ethylidene sulfonate.

The products formed as described in the foregoing examples are similar in their characteristics. They are generally of white crystalline or powder form and are all very soluble in water and no free amine is present.

The activity of some of the compounds included in our invention against *Mycobacterium tuberculosis* are tabulated below. The figures indicate the highest dilution that still inhibits the growth of *Mycobacterium tuberculosis* under a particular set of experimental conditions as regards inoculum, culture, etc., thereby making a comparable series.

| Name of Compound | Highest Dilution Showing Bacteriostasis |
|---|---|
| 2-ethoxy, 5-aminopyridine sodium ethylidene sulfonate | 1/25,000 |
| 2-butoxy, 5-aminopyridine sodium ethylidene sulfonate | 1/3,200,000 |
| 2-isoamyloxy, 5-aminopyridine sodium ethylidene sulfonate | 1/100,000 |
| 2-hexyloxy, 5-aminopyridine sodium ethylidene sulfonate | 1/3,200,000 |
| 2-octyloxy, 5-aminopyridine sodium ethylidene sulfonate | 0 |
| 2-diethylmethoxy, 5-aminopyridine sodium ethylidene sulfonate | 1/800,000 |
| 2-allyloxy, 5-aminopyridine sodium ethylidene sulfonate | 1/200,000 |
| 2-methoxyethoxy, 5-aminopyridine sodium ethylidene sulfonate | 1/50,000 |
| 2-phenyloxy, 5-aminopyridine sodium ethylidene sulfonate | 1/4,500 |
| 2-tetrahydrofurfuryloxy, 5-aminopyridine sodium ethylidene sulfonate | 1/6,250 |

The therapeutic compounds of our invention, therefore, present highly valuable and unexpected bacterio-static properties especially against such bacteria as cause tubercular infections, although their usefulness is not limited to that particular disease.

We do not limit ourselves to the specific limitations mentioned, as these are given solely for the purpose of clearly describing our invention as set forth herein.

The applicants herein are the applicants in patent application Serial No. 602,404, now Patent No. 2,458,584, for "Methylene sulfonate derivatives of alkyl compounds and aryl compounds."

What we claim is:

1. Compounds having the general formula:

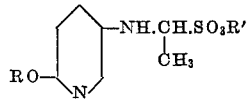

in which R is a member selected from the group consisting of alkyl radicals and alkoxyalkyl radicals having not more than eight carbon atoms and aryl radicals and in which R' is a member selected from the group consisting of hydrogen and alkali metals.

2. Compounds having the general formula:

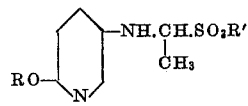

in which R is a member selected from the group consisting of alkyl radicals having not more than eight carbon atoms, and in which R' is a member selected from the group consisting of hydrogen and alkali metals.

3. Compounds having the general formula:

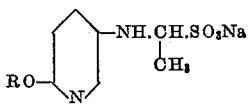

in which R is a member selected from the group consisting of alkyl radicals and alkoxyalkyl radicals having not more than eight carbon atoms and aryl radicals.

4. 2-butoxy, 5-aminopyridine sodium ethylidene sulfonate.

5. 2-hexyloxy, 5-aminopyridine sodium ethylidene sulfonate.

6. 2-diethylmethoxy, 5-aminopyridine sodium ethylidene sulfonate.

HARRIS L. FRIEDMAN.
LEO D. BRAITBERG.

No references cited.